(12) United States Patent
Uzun

(10) Patent No.: US 6,606,681 B1
(45) Date of Patent: Aug. 12, 2003

(54) OPTIMIZED CONTENT ADDRESSABLE MEMORY (CAM)

(75) Inventor: Necdet Uzun, San Jose, CA (US)

(73) Assignee: Cisco Systems, Inc., San Jose, CA (US)

( * ) Notice: Subject to any disclaimer, the term of this patent is extended or adjusted under 35 U.S.C. 154(b) by 125 days.

(21) Appl. No.: 09/792,625

(22) Filed: Feb. 23, 2001

(51) Int. Cl.$^7$ .......................... G06F 12/00; H04L 12/28
(52) U.S. Cl. ...................... 711/108; 711/156; 370/392
(58) Field of Search .......................... 711/108; 370/392; 709/238, 249

(56) References Cited

U.S. PATENT DOCUMENTS

| | | |
|---|---|---|
| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,319,763 A | 6/1994 | Ho et al. |
| 5,383,146 A | 1/1995 | Threewitt |
| 5,440,715 A | 8/1995 | Wyland |
| 5,450,351 A | 9/1995 | Heddes |
| 5,481,540 A | 1/1996 | Huang |
| 5,515,370 A | 5/1996 | Rau |
| 5,740,171 A | 4/1998 | Mazzola et al. |
| 5,841,874 A | 11/1998 | Kempke et al. |
| 5,842,040 A | 11/1998 | Hughes et al. |
| 5,898,689 A | 4/1999 | Kumar et al. |
| 5,920,886 A | 7/1999 | Feldmeier |
| 5,930,359 A | 7/1999 | Kempke et al. |
| 5,956,336 A | 9/1999 | Loschke et al. |
| 5,978,885 A | 11/1999 | Clark, II |
| 6,000,008 A | 12/1999 | Simcoe |
| 6,041,389 A | 3/2000 | Rao |
| 6,047,369 A | 4/2000 | Colwell et al. |
| 6,061,368 A | 5/2000 | Hitzelberger |
| 6,069,573 A | 5/2000 | Clark, II et al. |
| 6,081,440 A | 6/2000 | Washburn et al. |
| 6,091,725 A | 7/2000 | Cheriton et al. |
| 6,097,724 A | 8/2000 | Kartalopoulos |
| 6,134,135 A | 10/2000 | Andersson |
| 6,137,707 A | 10/2000 | Srinivasan et al. |
| 6,141,738 A | 10/2000 | Munter et al. |
| 6,148,364 A | 11/2000 | Srinivasan et al. |
| 6,154,384 A | 11/2000 | Nataraj et al. |
| 6,175,513 B1 | 1/2001 | Khanna |
| 6,181,698 B1 | 1/2001 | Hariguchi |
| 6,199,140 B1 | 3/2001 | Srinivasan et al. |
| 6,236,658 B1 | 5/2001 | Essbaum et al. |
| 6,237,061 B1 | 5/2001 | Srinivasan et al. |
| 6,240,003 B1 | 5/2001 | McElroy |
| 6,243,667 B1 | 6/2001 | Kerr et al. |
| 6,246,601 B1 | 6/2001 | Pereira |
| 6,295,576 B1 | 9/2001 | Ogura et al. |
| 6,307,855 B1 | 10/2001 | Hariguchi |
| 6,377,998 B2 * | 4/2002 | Noll et al. ................. 709/236 |
| 2001/0053150 A1 * | 12/2001 | Clear et al. ................ 370/392 |

OTHER PUBLICATIONS

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlang, New York.

(List continued on next page.)

Primary Examiner—Matthew Kim
Assistant Examiner—Woo H. Choi
(74) Attorney, Agent, or Firm—The Law Office Kirk D. Williams

(57) ABSTRACT

A method and apparatus for realizing a content addressable memory. The content addressable memory including an associative memory portion including N entries, each entry including a key and an M-bit type indicator. The content addressable memory further including a random access memory portion. The random access memory portion includes K*N entries where a single key stored as an entry in the associative memory portion is mapped to K entries in the random access memory portion, where K is greater than 1.

8 Claims, 5 Drawing Sheets

OTHER PUBLICATIONS

Brian Dipert, ed., "Special–purpose SRAMs Smooth the Ride," EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

"Advantges of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LANCAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPV4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

OPTIMIZED CONTENT ADDRESSABLE MEMORY (CAM)

TECHNICAL FIELD

This invention relates generally to packet switched communication systems.

BACKGROUND

With reference to computing systems, memory refers to a place where the computing system holds information, such information able to be accessed and worked on as appropriate. Random Access Memory (RAM) can be used in a personal computer to temporarily store data that is currently being accessed or worked on. Read-only memory can be used for storage of information that does not change. A conventional memory structure includes a memory space of data that includes a plurality of entries, each identifiable by a specific location in the memory space. Each entry has a name (the address) that serves to locate the contents within the memory space.

An associative memory element, more commonly referred to as content addressable memory (CAM), includes a different structure. CAM element objects are selected based on their contents, not based on their location in the memory space. Each CAM element includes a key and associated data. Examples of associative memory elements include a hash table and set-associative table. A content addressable memory is searched (searching of the keys in the CAM memory space) and returns a data value (data word) upon detecting a valid match condition for a given key. The CAM contains all keys to be compared during a search operation. In a conventional CAM, each key (i.e., entry) in the CAM is associated with a single data word. The association can be by location, that is, entries in the CAM can map directly to data stored in a RAM. As such, the associative data portion of the CAM can be of the form of an actual data word or a pointer to the data word that is associated with the corresponding key.

In use, a CAM is searched whenever the information associated with a key is needed. A search is performed in the valid portion of the CAM. If a match is detected, a data word associated with the matching key is returned. Where the association is by location, the address of the key is obtained when a match is detected. Using the returned address, data can be read from, for example, a RAM that is used to store the associated data words.

An example of a conventional CAM including associated RAM for storing data words is shown in FIG. 1a. The CAM 100 includes a plurality of entries 102, each including a valid bit 104 and a key 106. The valid bit is set for each valid entry in CAM 100. Not shown, but associated with each entry in the CAM 100, is an address for a given entry. Data words are stored in an external RAM 108. Data words are located in RAM 108 in accordance with the addresses associated with the given entries (keys) in CAM 100. An external search engine 110 provides keys to be searched for in the information space associated with CAM 100. Thereafter, the valid portion of the CAM 100 (all valid entries) is searched. The address of a matching key is obtained upon detection of a match. The address is in turn forwarded to control logic 111. Control logic 111 uses the address to access the appropriate data word stored in the RAM 108 (the data word associated with the key being searched).

Another example of a conventional CAM is shown in FIG. 1b, which is used to make forwarding decisions of packets in a router or switch. Each entry 102 in CAM 150 can include a tag 112. The tag 112 is used to designate the entry as being either a source address or destination address. Accordingly, the same key can be stored multiple times in CAM 150 as a source address and as a destination address. Depending on whether the search invoked by search engine 110 is for a destination address or source address, different hits will result in CAM 150 for the same key. The number of entries or blocks in CAM 150 is equal to the sum of the number of source addresses and destination addresses that are to be searched.

CAM memory tends to be expensive (relative to RAM). As the information base associated with a CAM grows, such as when multiple copies of the same key are included in the CAM, costs rise. What is desired is a means to be able to minimize the CAM size while still realizing the benefits derived from an associative memory structure.

SUMMARY

In one aspect, the invention provides a content addressable memory including an associative memory portion including N entries, each entry including a key. The content addressable memory further includes a random access memory portion. The random access memory portion includes K*N entries where a single key stored as an entry in the associative memory portion is mapped to K entries in the random access memory portion, where K is greater than 1.

Aspects of the invention can include one or more of the following features. Each entry in the random access memory portion can be associated with a single key and can include information based on the key type. The type can be a source or destination address. The type can be a MAC address or an MPLS label. Each entry can include an M-bit type indicator, where M is greater than 1. The number of types can be two, source and destination addresses. The content addressable memory can be configured such that K=M.

In another aspect the invention provides a content addressable memory including an associative memory portion including N entries, each entry including a key and an M-bit type indicator, where M is greater than 1. The content addressable memory further includes a random access memory portion. The random access memory portion includes N entries including K portions where a single key stored as an entry in the associative memory portion is mapped to a single entry in the random access memory including the K portions, where K is greater than 1.

In another aspect, the invention provides a content addressable memory for storing MAC addresses and MPLS labels and includes an associative memory portion including N entries. Each entry includes a key and an M-bit type indicator, where M is greater than 1. Each key is of the form of a MAC address or MPLS label or both as indicated by the type indicator. The content addressable memory further includes a random access memory portion. The random access memory portion including K*N entries where a single key stored as an entry in the associative memory portion is mapped to up to K entries in the random access memory portion, where K is greater than 1.

In another aspect, the invention provides a method for storing MAC addresses in a content addressable memory. The content addressable memory includes an associative portion and a random access portion. The associative portion includes one or more entries each including an address. The random access portion is operable to store information relevant to each address. The method includes associating a single address with plural entries in the random access memory when the single address is maintained in the associative portion of the content addressable memory for two different contexts, one dependent on whether the address is a source address and one dependent on whether the address is a destination address.

In another aspect, the invention provides a method for storing MAC addresses in a content addressable memory. The content addressable memory includes an associative portion and a random access portion. The associative portion includes one or more entries each including an address. The random access portion is operable to store information relevant to each address. The method includes determining if an address is present in the associative portion for a first context, either as a source address or destination address. If the address is present, marking the address in the associative portion to indicate that the address is to be associated with a second context. Information relevant to the second context and associated with the address is added to the random access portion including mapping the address to relevant information stored in the random access portion associated with the first context and the second context.

In another aspect, the invention provides a method for storing MAC addresses and MPLS labels in a content addressable memory. The method includes determining if a key is present in a first entry in the associative portion for a first context, either as a source address or destination address or both. If so, a portion of the key to be associated with an MPLS label is located. A same portion for all other keys in the content addressable memory is checked to see if the portion matches. If not, the address in the associative portion of the first entry is marked to indicate that the address is to be associated with a second context, the second context being an MPLS label. Information relevant to the second context and associated with the address is added to the random access portion including mapping the address to relevant information stored in the random access portion associated with the first context and the second context.

Aspects of the invention can include one or more of the following features. If the portion matches, a second portion of the key to be associated with a second MPLS label is located. A same portion for all other keys in the content addressable memory is checked to see if the second portion matches. If not, the address in the associative portion is marked to indicate that the address is to be associated with a second context, the second context being an MPLS label. Information relevant to the second context and associated with the address is added to the random access portion including mapping the address to relevant information stored in the random access portion associated with the first context and the second context.

Aspects of the invention can include one or more of the following advantages. An optimized CAM is proposed that minimizes the CAM portion of a device at the expense of an external RAM portion of the device. The RAM portion of the device associated with the optimized CAM can be scaled up to accommodate a larger information base while keeping the associated CAM portion of the device the same size or smaller. The optimized CAM can include multi-use elements. The multi-use elements allow the optimized CAM to exploit the whole of the information base to be stored and searched while minimizing the number of entries required to support such operations. The optimized CAM provides a means to combine the search space for the information base to include both Ethernet MAC addresses and MPLS labels. The optimized CAM provides silicon area saving as well as saving in search time with respect to conventional CAM solutions for the same size of search information base. The optimized CAM enables supporting a mix of Ethernet type and MPLS type packets in the same network. One application of the optimized CAM is to implement a resilient packet ring media access controller (MAC). A resilient packet ring MAC provides functionality to allow spatial reuse of bandwidth and resiliency in a ring-based media. The resilient packet ring MAC can operate with Ethernet/802.3 and MPLS packets.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

An optimized CAM is presented for use in plural digital switching applications. The optimized CAM can be used in conjunction with a Spatial Reuse Protocol (SRP) [RFC2892] forwarding block in a node of a network ring. The SRP forwarding block can be used to decide what traffic to add to the ring. The optimized CAM can be used in association with a lookup block of the SRP forwarding block. The lookup block performs searches for packets and returns relevant information. The relevant information can include decision information as to whether to pass a given packet using the SRP forwarding block to the ring or alternatively redirect the packet to a host associated with a respective node. The lookup block can be used for other operations (other than forwarding or filtering) such as for accounting, billing, traffic management or legacy operations.

Look-Up Block

Figure 1A:
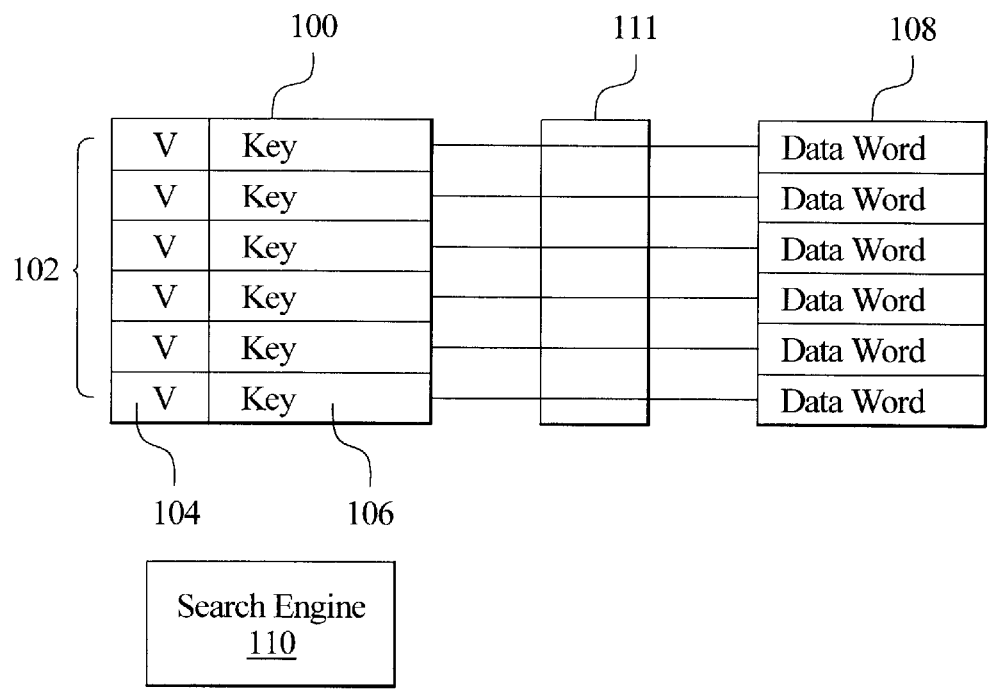
FIG. 1a is a block diagram of a conventional CAM.
Figure 1B:
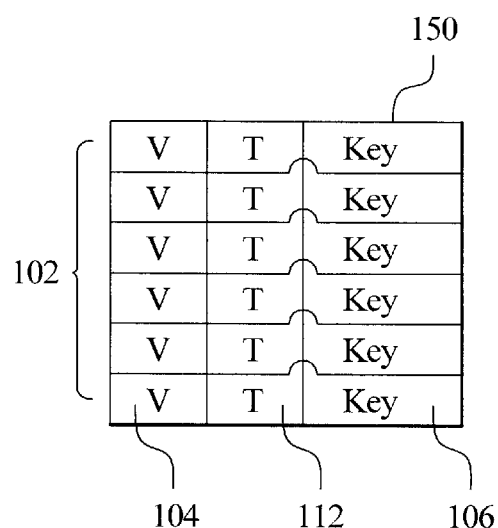
FIG. 1b is a block diagram of another conventional CAM.
Figure 2A:
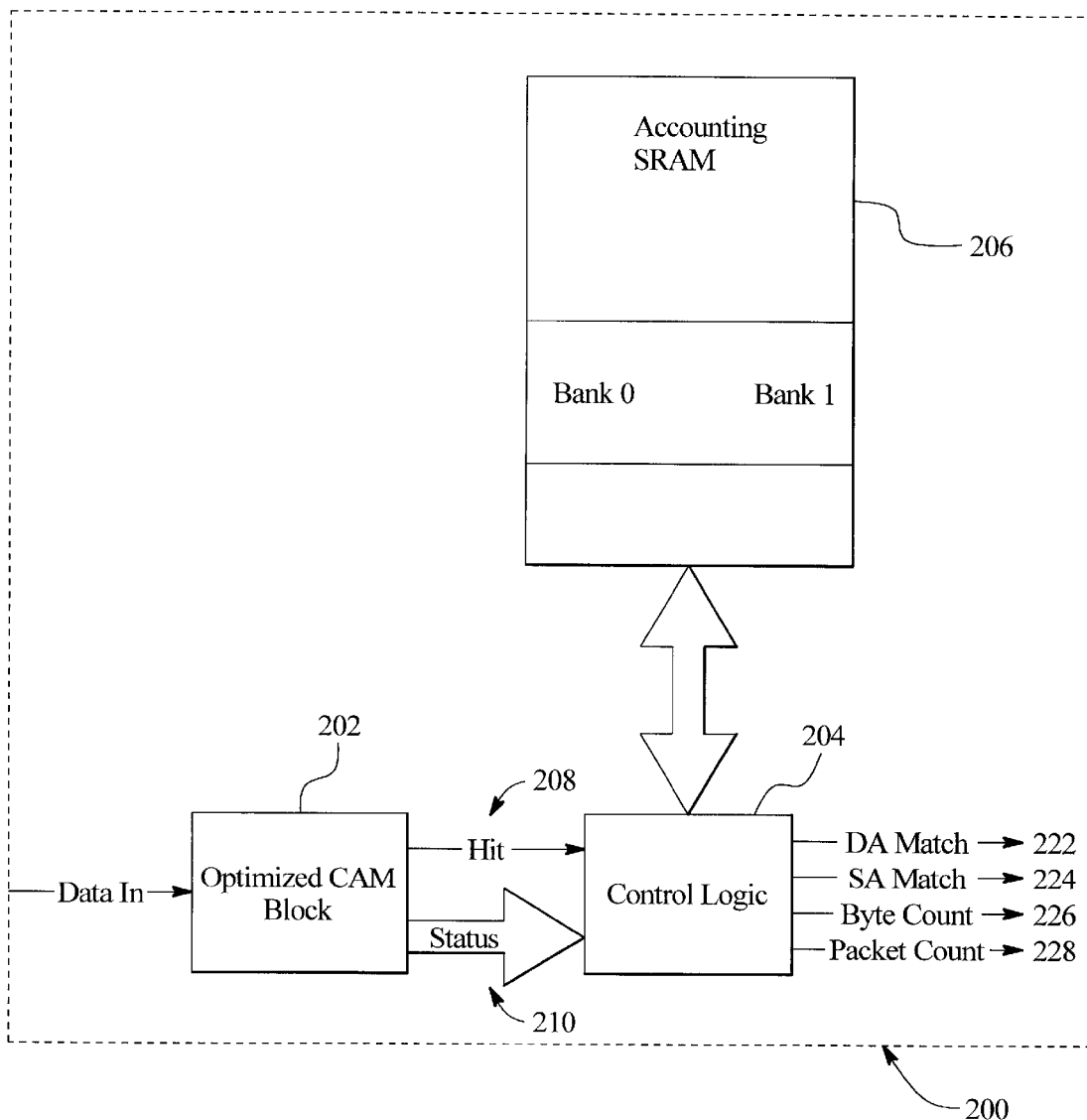
FIG. 2a is a block diagram of a lookup block including an optimized CAM block.

Referring now to FIG. 2a, a lookup block 200 includes an optimized CAM block 202, control logic 204 and memory 206.

Data packets enter optimized CAM block 202 and the address for each packet is extracted from the packet header and provided as a search string to a CAM. A hit is made if there is a match with a key stored in the CAM. Optimized CAM block 202 provides as an output a hit indication on hit signal line 208 and associated status bits on status bus 210 to control logic 204. Details of the optimized CAM block 202 are described in greater detail below in association with FIGS. 2b and 2c.

Control logic 204 receives the hit signal and associated status bits on hit signal line 208 and status bus 210. Control logic 204 is used to monitor the optimized CAM block 202 output including to count the number of times an address in the CAM has been matched, and the number of bytes in the matched packets. Control logic 204 provides as an output a destination address match signal 222, source address match signal 224, byte counter signal 226 and a packet counter signal 228 to convey accounting information to a next block in the system.

Memory 206 stores accounting information associated with lookup block 200. In one implementation, memory 206 is a dual bank SRAM (1024 words×144 bits SRAM) and is used to store the number of times an address in the CAM has been matched as well as the accumulated number of bytes in the matched packets. In one implementation, memory 206 is sized to store 1024 entries of 144 bits per entry. In this implementation, bits 0 through 71 are associated with source addresses while bits 72 through 143 are associated with destination addresses. The 144-bit entries can be stored in two banks of 1024 words×72 bits where the most significant bit of the address chooses the bank (e.g., Bank 0 is for Source Addressee [SA] and Bank 1 is for Destination Addressee [DA]).

Optimized CAM Block

Figure 2B:
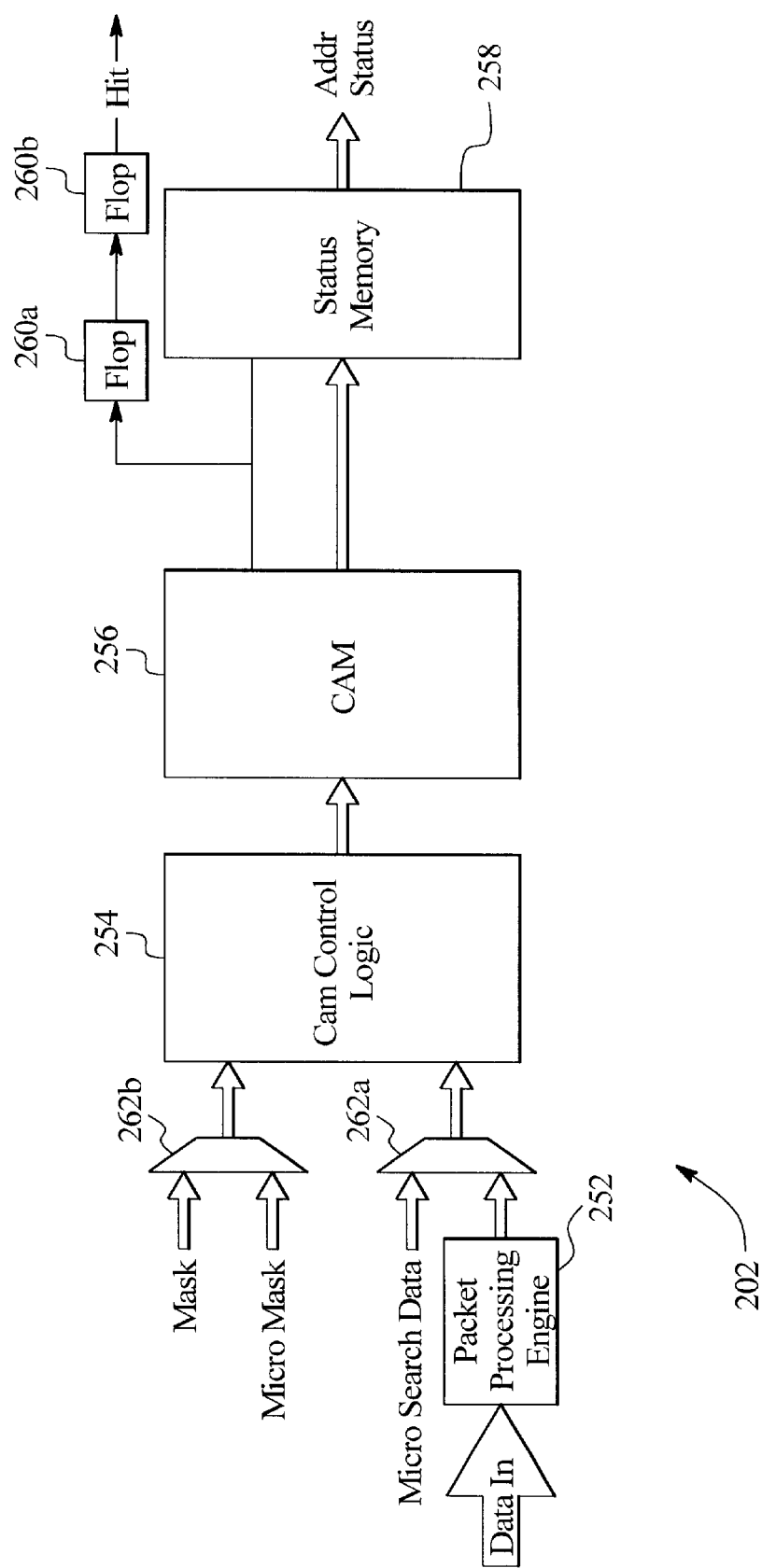
FIG. 2b is a block diagram of an optimized CAM block.

Optimized CAM block 202 is shown in more detail in FIG. 2b and includes a packet processing engine 252, CAM control logic 254, CAM (information space) 256, status memory 258, flip-flops 260 and selectors 262. Optimized CAM block 202 finds matches between addresses contained in a packet with that of the addresses associated with a given node (and stored in CAM 256).

Packet processing engine 252 receives as an input packets for processing and operates to extract address information from each packet. Packet processing engine 252 forwards the extracted address information in the form of a search string to CAM control logic 254 via selector 262a.

CAM control logic 254 receives search strings for processing and includes means for initiating and controlling searches of the information stored in CAM 256. CAM control logic 254 also receives masking information through selector 262b for use in masking portions of a key when executing a search. Masking search strings is described in greater detail below. CAM control logic 254 configures CAM 256 into its operational modes (access and search modes), the details of which are described in greater detail below. In addition, CAM control logic 254 controls reset, read, write and probe operations. CAM probe operations can be invoked to check that the CAM search routine is operational (during prototype testing) or during normal operations to determine if an address exists in the CAM 256. CAM control logic includes plural registers for use in loading search strings and keys as well as controlling the operation of CAM 256.

Figure 2C:
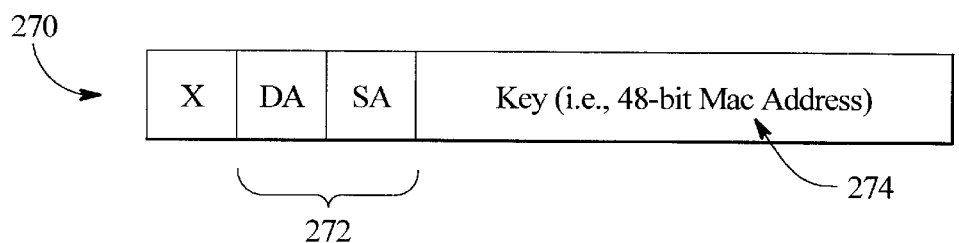
FIG. 2c is a block diagram of a data structure stored in the optimized CAM block of FIG. 2b.

CAM 256 is the repository of keys. CAM 256 includes one or more entries each including a key. Each entry in CAM 256 includes location data designating where in the information space associated with CAM 256 an entry is located. The location data, or address for the entry, maps to status bits stored at a complementary location in status memory 258. The structure and contents of status memory 258 is described in greater detail below. A data structure for entries stored in CAM 256 is shown in FIG. 2c. Each entry 270 includes a tag with source/destination address bits 272 and a key 274. In one implementation, the source/destination address bits 272 are two binary bits and indicate if the associated key entry (address) is a source or destination address or both. This aids in the searching of CAM 256 as will be described in greater detail below. In one implementation, the source/destination bits 272 are set as described in Table 1.

TABLE 1

| | Source/Destination Address bits |
|---|---|
| DA/SA | Description |
| 00 | Invalid entry |
| 01 | The address is a Source Address |
| 10 | The address is a Destination Address |
| 11 | The address is both a Source and a Destination Address |

Key 274 can be a 48 bit MAC address. Alternatively, key 274 can be an MPLS label or tag. The use of MPLS labels is described in greater detail below. In one implementation, there is no restriction on the ratio of source addresses compared to destination addresses stored in CAM 256. In one implementation, CAM 256 is sized to store a maximum of 1024 different 48-bit MAC Addresses (1024 words by 52 bits, where two bits are used for DA/SA, 48 for MAC address and two bits are unused).

CAM 256 includes a valid bit (not shown) associated with each address location. Whenever a full reset or address location reset occurs, the valid bit is un-set. Operationally, CAM 256 only examines entries having a valid bit that is set. The valid bit is set when data is written to a given address location.

CAM 256 includes a search routine (not shown). The search routine is invoked upon receipt of a search string from CAM control logic 254. The search routine compares the search string to the CAM's key entries, masking bits in accordance with any received masking information, and returns an address for a matching entry as an output. CAM 256 operates in two modes, search and access. In search mode, CAM 256 operates on search strings received from CAM control logic 254 and locates matching keys and their associated status address information as described above. In access mode, CAM 256 operates as a RAM, and can be read from or written to using conventional address and data busses (not shown) supported by CAM 256.

Status memory 258 can be of the form of an SRAM. Status memory 258 includes information status bits associated with the keys in CAM 256. Each address location in the CAM 256 has a direct relationship with the data stored in the status memory 258 (e.g., the address stored in CAM location 0×25 has its corresponding status bits stored in the status memory at location 0×25). The hit address determined in a search of CAM 256 for a given key is provided to status memory 258 so that the associated status information (bits) can be fed into the next block (the control logic block 204) of the device. In one implementation, the data structure for an entry stored in status memory 258 is four binary bits (0:3). In this implementation, bit 0 is associated with destination addresses, while bits (1:3) are associated with source addresses. Forwarding decisions for the packet are determined based on the values of the status bits. The status bits are set up in accordance with the information described in Table 2.

TABLE 2

Status Bits

| bit | Name | Description |
| --- | --- | --- |
| 0 | DAH | Destination address to host-if set to 1 indicates that the associated address stored in the CAM is a destination address destined for the Host |
| 1 | SAM | Source address monitor-This bit has no effect on the forwarding decision for the packet. Set to 1 to increment the associated packet monitor (PM) counter |
| 2 | NE | Node address-when set to 1, indicates that the source address is the address of the current node. |
| 3 | SAA/reject | Source address accept/reject bit-This bit is used for packet filtering operations. |

As described above, status memory 258 includes entries with portions (bits) associated with each of source addresses and destination addresses, respectively. Control logic 204 and other portions of the device read/use the appropriate portions of the status bits. In the example above, if the address being searched is a destination address, then only bit 0 of the status bits is read, the remaining bits being ignored. Conversely, if the address being searched is a source address, status bits (1:3) are used, with bit 0 being ignored.

Figure 2D:
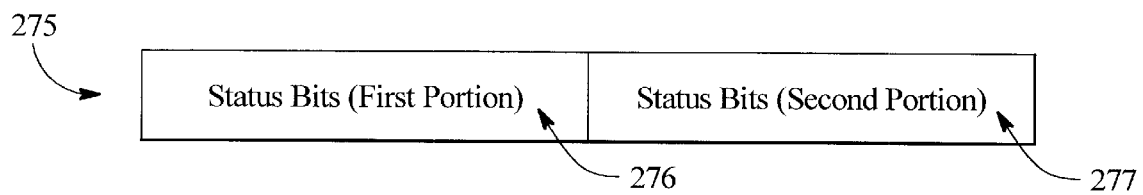
FIG. 2d is a block diagram of a data structure for an entry in the status memory of FIG. 2b.

The configuration described above should not be construed as limiting. In the example above, where each key can be either a source or destination address or both, a single entry stored in CAM 256 is mapped to plural chunks of status information that are in turn stored in an entry in status memory 258. The "entry" in status memory 258 can be sized in accordance with the information required to be stored. The entry includes plural portions (i.e., one portion associated with each chunk of status information (e.g., one portion for the relevant source address information and one for the relevant destination address information)), each of which can include plural bits, bytes or words of data. Referring now to FIG. 2d, a general block diagram for an entry in status memory 258 is shown. Each entry 275 includes first and second portions 276 and 277, respectively. In the implementation described above, the first portion can be dedicated to include relevant information for destination addresses and be sized to be one bit in length, while the second portion can be dedicated to include relevant information for source addresses and be sized to be three bits in length. Status memory 258 can have a width (in words or bytes or bits) to accommodate the information that is required to be stored for each of the different types of keys (e.g., source address, destination address) stored in CAM 256. Status memory 258 can dedicate any number of bits/bytes/words to each key type for a given entry.

Status memory 258 includes a one-to-one mapping of entries in CAM 256 with an entry in the status memory 258. As described above, each entry includes two (or more, as described below) portions. Which portions are relevant depends on the type of address being searched (for example, source or destination).

Figure 2E:
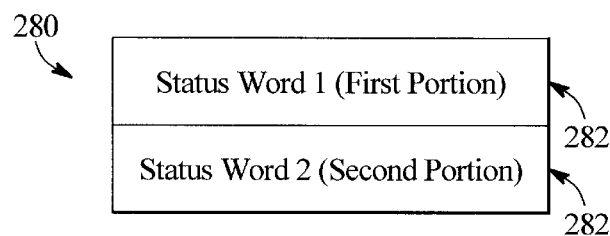
FIG. 2e is a block diagram of a data structure for a virtual entry in the status memory of FIG. 2b.

In one implementation, each entry in CAM 256 is associated with plural locations (forming a single "virtual entry") in status memory 258. For example, referring now to FIG. 2e, each entry in CAM 256 can be associated with a virtual entry 280 in status memory 258 and include two (or more) contiguous words 282. Logic can be included to map the address provided from CAM 256 to the tuple (or other defined set of words) stored in status memory 258. Which word of the tuple (or set) is read, can depend on the type of address being searched for. In this example, CAM 256 includes N addressable entries, while status memory 258 includes K*N physical addressable entries (corresponding to N virtual entries). Accordingly, optimized CAM block 202 provides a 1 to N mapping from entries in CAM 256 to relevant information stored in a respective entry or "virtual entry" of status memory 258. Mapping schemes are described in greater detail below.

Referring again to FIG. 2b, flip flops 260a–b provide a delayed and synchronized hit status signal for output by optimized CAM block 202 to control logic 204 of FIG. 2a. The hit status and status address, can also be provided directly to a microcontroller.

a. Searching

The search for a destination address includes setting the CAM mask and search bits as appropriate (the DA search bit to '1', and the SA bit to '0') provided from CAM control logic 254, and applying the extracted destination address received from the packet processing engine 252 to search bits [47:0]. If a match is made (and DAH Status bit=1), the destination match address signal 222 is held high for the entire packet.

The search for a source address includes setting the CAM mask and search bits as appropriate (the DA search bit to '0', and the SA bit to '1') provided from CAM control logic 254, and applying the extracted source address received from the packet-processing engine 252 to search bits [47:0]. If a match is made, the source address match signal 224 is held high for the entire packet (SAM Status Bit is not required).

b. Adding Entries to the CAM 256

When a new Ethernet entry (MAC address) for a destination address (or source address) needs to be added to the CAM 256, the full address is searched in the CAM 256 for a possible existing source address (destination address) entry with the same value. If a matching entry is found, the same entry (location) is used for both the source and destination address. The source/destination bits are set to indicate that the entry is both a source and destination address. In addition, the relevant destination information (source information) can be provided and stored in the status memory as appropriate.

MPLS Labels and Ethernet addresses

Figure 3:
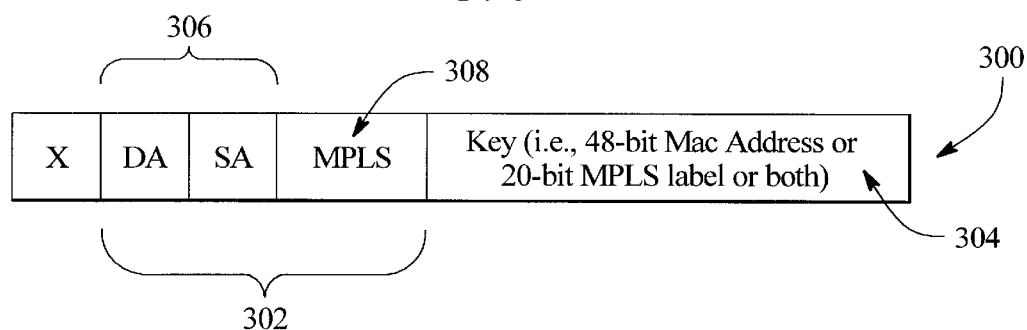
FIG. 3 is a block diagram for an alternative data structure stored in the optimized CAM block of FIG. 2b for supporting MAC addresses and MPLS labels.

As described above, the optimized CAM block 202 can include a mapping from each CAM 256 entry (N entries in total) to plural physical entries (K*N) in status memory 258. In the implementation described, each of the physical entries in status memory 258 corresponded to relevant information associated with a particular type of key stored in CAM 256. Addresses of different types can be stored in CAM 256. The example above described source and destination addresses as might be associated with Ethernet packets. However, other packet formats can be supported. For example, MPLS labels can be stored in CAM 256 along with Ethernet source and destination addresses. An alternative data structure associated with entries in CAM 256 is shown in FIG. 3. Each entry 300 includes tag bits 302 and a key 304. The tag bits indicate the type of key stored. In one implementation, tag bits 302 can include 3 bits for designating whether the key (address) stored in CAM 256 for a given entry is a source address, destination address, both and/or an MPLS label. In one implementation, two source/destination address bits 306 are included and indicate if the associated key entry (address) is a source or destination address or both. In one implementation, the source/destination bits are set as described in Table 1. Tag 302 also includes a single MPLS label bit 308 to indicate that the address stored is an MPLS label.

Conventional MPLS labels are 20 bits in length, while Ethernet source or destination addresses are sized to be 48 bits. When used as an MPLS label, CAM 256 only evaluates 20 bits of a given key. In one implementation, the relevant 20 bits are the first twenty bits of the key. Alternatively, the last twenty bits or some other combination of bits can be identified as being relevant for evaluation when searching for an MPLS label. Table 3 includes a description for how to set the tag bit values for a combined Ethernet address and MPLS label information space.

TABLE 3

Source/Destination Address/MPLS label bits

| Tag bits (DA/SA/MPLS) | Description |
| --- | --- |
| 00 | Invalid entry |
| 01x | The address is a Source Address |
| 10x | The address is a Destination Address |
| 11x | The address is both a Source and a Destination Address |
| xx1 | The address includes an MPLS label |
| 111 | The address is a source, a Destination Address and an MPLS label. |
| xxx | (note: All 8 combinations are possible) |

Key 304 can be a 48 bit MAC address or an MPLS label or both. Key 304 can be both an MPLS label and a MAC address where its length is 48 bits, and where 20 of the bits are associated with an MPLS label. In one implementation, there is no restriction on the ratio of source addresses compared to destination addresses or MPLS labels stored in the CAM 256. In one implementation, CAM 256 is sized to store a maximum of 1024 different 48-bit MAC Addresses or MPLS label (1024 words by 52 bits, where three bits are used for DA/SA/MPLS, 48 for MAC address or MPLS label and one bit is unused). As described above, CAM 256 can include a valid bit associated with each address location.

Where, as here, CAM 256 includes three types of entries (source address, destination address and MPLS label), status memory 258 is appropriately sized (3*N) to include a physical entry (or portion of a wide entry) that is relevant to each type of key (address). Again, a mapping from a hit address presented by CAM 256 to a relevant portion of an entry, or to a physical entry in a larger virtual entry in status memory 258 may be required. Alternatively, only the relevant portion of an entry in status memory 258 may be read and passed to a next block in the system. In one implementation, CAM 252 includes 1024 entries and a status memory 257 is composed of a 3072 entry RAM (or 1024 triple-entry RAM) to support a fully populated and integrated MAC address and MPLS label information space.

a. Operation

When an Ethernet packet arrives, its destination (or source address) is extracted from the packet header. The search for destination address (or source address) is performed by selecting (using masking of individual CAM bits) the valid bit, appropriate tag bits 302 (3 bits) and the key 304 (48 bits) and applying destination address (or source address) at the search input of the CAM 256. If there is a hit, the index (hit address) output of the CAM 256 is used as the read address of the RAM to read the corresponding data entry from status memory 258.

When an MPLS packet arrives, the search for a matching MPLS label includes selecting (using masking of individual 20 CAM bits) the appropriate tag bit 302 (3 bits) and the key 304 (20 bits). Upon a hit, the relevant information (the corresponding data entry) from status memory 258 is read.

b. MPLS label selection

When a new MPLS label needs to be assigned to a new connection, the MPLS label can be chosen in a way that its 20 bit value matches to a predetermined portion (as many bits as the size of an MPLS label—20 bits) of an existing source address/destination address (48 bits) already stored in the CAM 256. This can be accomplished since MPLS labels have no global meaning and can be chosen independently by a local node according to its label resources.

MPLS labels may be assigned as outlined above using source address and destination address values starting from the top of the CAM 256 if there is at least one Ethernet entry present. The tag bits 302 associated with the selected entry are set to indicate that the entry can also be an MPLS label by setting tag bit 308. A pointer (not shown) can be used to remember the last used location. The next time an MPLS label is needed, the same process is repeated starting from the pointer location if there is at least one unassigned Ethernet entry in CAM 256. Otherwise, an unused number can be assigned randomly or using any other method. When an unused number is assigned, the unused number is added to CAM 256 as a new entry.

Before committing to a mapping between a source address/destination address entry and a 20 bit MPLS label (i.e., one entry is to serve as both a source/destination address and an MPLS label), a search for the 20 bit MPLS label value is performed over the remaining portion of the CAM 256 information space. If plural hits arise (i.e., hit address is different than the address of the proposed MPLS label), then the proposed MPLS label is not unique in the information space, and as such another Ethernet entry is selected.

c. Adding Entries to the CAM 256

When a new Ethernet entry for a destination (source) address needs to be added to the CAM 256, the first full address is searched in the CAM 256 for a possible existing source (destination) address entry with the same value. If it is found, the same location is used for both. If it is not found, a new search in the CAM 256 for a possible existing MPLS label with the same 20 bit value is performed. If a matching MPLS label is found, the same location is used for the destination (source) address entry as well. If there is no match found in the CAM 256, this new destination (source) address entry is inserted to an empty location by writing the destination address into the key field 304, setting the valid bit to valid, and setting tag bits 308 to an appropriate value (e.g., 100 for a destination address or 010 for a source address).

If CAM 256 becomes almost full with source/destination address and MPLS entries and if there are unmapped source addresses or destination address entries, some of the existing unmapped MPLS entries can be reassigned so that they map to a previously unmapped source/destination address. The change can be communicated to the downstream node so that labels are swapped correctly. Note that while a change is being communicated to the downstream node, both the new and old MPLS labels should be kept in the CAM 256. Right after a confirmation is received, the old value can be removed from the CAM 256.

Plural MPLS Labels

Figure 4:
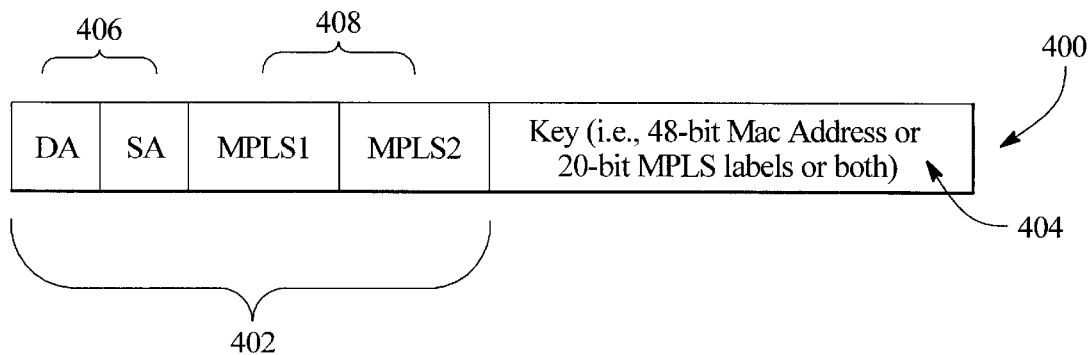
FIG. 4 is a block diagram for an alternative data structure stored in the optimized CAM block of FIG. 2b for supporting MAC addresses and plural MPLS labels.

In one implementation, plural MPLS labels can be mapped to a single source/destination address. An alternative data structure associated with entries in CAM 256 that include plural MPLS labels is shown in FIG. 4. Each entry 400 includes tag bits 402 and a key 404. The tag bits indicate the type of key stored. In one implementation, tag bits 402 can include 4 bits for designating whether the key (address) stored in CAM 256 for a given entry is a source address, destination address or both and whether the entry includes one or two MPLS labels. In one implementation, two source/destination address bits 406 are included and indicate if the associated key entry (address) is a source or destination address or both. In one implementation, the source/destination bits are set as described in Table 1. Tag 402 also includes two MPLS label bits 408 to indicate that the address stored includes one or two MPLS labels.

As described above, conventional MPLS labels are 20 bits in length, while Ethernet source or destination addresses are sized to be 48 bits. When used as an MPLS label, only 20 bits of the key are evaluated. Accordingly, a key can include a single source or destination address or can accommodate up to two MPLS labels. When searching for an MPLS label, CAM 256 only evaluates the relevant 20 bits of a given key associated with an MPLS label. In one implementation, the first 20 bits are used for a first MPLS label and the last 20 bits are used for the second MPLS label. Alternatively, some other combination of bits can be identified as being relevant for evaluation when searching from among the two embedded MPLS labels. Table 4 includes a description for how to set the tag bit values for a combined Ethernet address and MPLS label information space where two MPLS labels can be included in a single entry.

TABLE 4

Source/Destination Address/multiple MPLS tag bits

| Tag bits (DA/SA/MPLS1/2) | Description |
| --- | --- |
| 0000 | Invalid entry |
| 01xx | The address is a Source Address |
| 10xx | The address is a Destination Address |
| 11xx | The address is both a Source and a Destination |
| xx1x | Address includes an MPLS label at location 1 |
| xxx1 | Address includes an MPLS label at location 2 |
| xx11 | Address includes an MPLS label at locations 1 & 2 |
| 1111 | The address is a source address, a destination address and includes 2 MPLS labels |
| xxxx | (note: All 16 combinations are possible) |

Key 404 can be a 48 bit MAC address or up to two MPLS labels or both. Key 404 can be both an MPLS label and a MAC address where its length is 48 bits, and where 20 (or 40) of the bits are associated with MPLS label(s). In one implementation, there is no restriction on the ratio of source addresses compared to destination addresses or MPLS labels stored in the CAM 256. In one implementation, CAM 256 is sized to store a maximum of 1024 different 48-bit MAC Addresses or MPLS labels (1024 words by 52 bits, where four bits are used for DA/SA/MPLS1/MPLS2 and 48 for MAC address or MPLS labels). As described above, CAM 256 can include a valid bit associated with each address location.

Where, as here, CAM 256 includes four types of entries (source address, destination address, MPLS label 1 and MPLS label 2), status memory 258 is appropriately sized (4*N) to include a physical entry (or portion of a wide entry) that is relevant to each type of key (address). Again, a mapping from a hit address presented by CAM 256 to a relevant portion of an entry, or to a physical entry in a larger virtual entry in status memory 258 may be required. Alternatively, only the relevant portion of an entry may be read and passed to a next block in the system. In one implementation, CAM 252 includes 1024 entries and a status memory 258 composed of a 4096 entry RAM (or 1024 quadruple-entry RAM) to support a fully populated and integrated MAC address and MPLS label information space.

a. Searching

As before, when an Ethernet packet arrives, its destination (or source address) is extracted from the packet header. The search for destination address (or source address) is performed by selecting (using masking of individual CAM bits) the valid bit, appropriate tag bit 402 (4 bits) and the key 404 (48 bits) and applying destination address (or source address) at the search input of the CAM 256. If there is a hit, the index (hit address) output of the CAM 256 is used as the read address of the RAM to read the corresponding data entry from status memory 258.

When an MPLS packet arrives, the search for the MPLS label is performed by selecting (using masking of individual CAM bits) the appropriate tag bit 402 (4 bits) and the key 404 (20 bits), first in a portion designated for storing a first MPLS label (i.e., MPLS1 space), then, if no hit is detected, in a second portion designated for storing a second MPLS label (i.e., MPLS2 space). Upon a hit, the relevant information (the corresponding data entry) from status memory 258 is read.

b. MPLS label selection

When a new MPLS label needs to be assigned to a new connection, the label is chosen in a way to match with one of two predetermined 20-bit portions of an existing source/destination address (48 bits) in CAM 256. Selecting and mapping labels is as described above.

c. Adding Entries to the CAM 256

Entries can be added to CAM 256 as described above.

d. Multiple Hits

Note that there may be multiple hits in MPLS searches if precaution is not taken when labels are assigned since an MPLS label is shorter than a MAC address (i.e., 20 bit portions of two MAC addresses may be equal). Either of the following three techniques can be used to resolve the multiple hit problem.

In a first technique, a multiple hit signal can be added to CAM 256. The multiple hit signal indicates that there are at least two matches when a search is performed. Note that multiple hits should not happen when a new MAC address is inserted since a probe should happen prior to an insertion. However, a multiple hit may happen in the MPLS portion of the CAM 256, whenever a new MAC address is inserted. When a probe in MPLS label portion(s) of a new MAC address indicates a multiple hit, the MPLS labels should be reassigned using the method described above before the new MAC entry is inserted. This way the MPLS searches will never result in a multiple hit later on.

In the second technique, CAM 256 does not need a multiple hit signal. Before adding a new entry, CAM 256 reads and compares the CAM information space to determine if there will be a multiple hit after adding the new entry. If there is no multiple hit, the compare operation will produce no results (and accordingly a multiple hit would not arise if the proposed entry were added). If the compare operation does not produce a hit, then the label can be assigned or added. If the new MAC entry will produce a multiple hit, the multiple hit can be resolved by reassigning existing MPLS labels to some other value that does not cause a multiple hit. Any reassignment has to be communicated to the upstream node.

Normally multiple hits should not happen as MAC addresses tend to be uncorrelated. However, if the same vendor produces multiple nodes in a network at the same time, they are likely to be assigned sequential numbers. When sequential numbers are used, multiple hits can be avoided (or reduced) by intelligently mapping the MAC address filed into 2 MPLS label fields in a way that resulting labels are somewhat randomized. One way of doing that would be using even bits of the MAC address for one label and using odd bits for the other label. Another way of reducing multiple hits is adding a few bits to the key field and concatenating them to the MAC addresses so that these few bits can be chosen (assigned) in a way to eliminate multiple hits in the MPLS label searches.

A number of embodiments of the invention have been described. Nevertheless, it will be understood that various modifications may be made without departing from the spirit and scope of the invention. Accordingly, other embodiments are within the scope of the following claims.

What is claimed is:

1. A method for storing MAC addresses and MPLS labels in a content addressable memory, the content addressable memory including an associative portion and a random access portion, the associative portion including one or more entries each including a key, the random access portion for storing information relevant to each key, the method comprising:

determining if a key is present in a first entry in the associative portion for a first context, either as a source address or destination address or both;

locating a first key portion of the key to be associated with an MPLS label;

checking first key portion for all other keys in the content addressable memory to see if the first key portion matches;

if the first key portion does not match, marking the address in the associative portion of the first entry to indicate that the address is to be associated with a second context, the second context being an MPLS label; and adding information relevant to the second context and associated with the address to the random access portion including mapping the address to relevant information stored in the random access portion associated with the first context and the second context.

2. The method of claim 1, further comprising:

if the first key portion matches, locating a second key portion of the key to be associated with a second MPLS label;

checking the second key portion for all other keys in the content addressable memory to see if the second key portion matches;

if the second key portion does not match marking the address in the associative portion to indicate that the address is to be associated with a second context, the second context being an MPLS label; and adding information relevant to the second context and associated with the address to the random access portion including mapping the address to relevant information stored in the random access portion associated with the first context and the second context.

3. The method of claim 1, wherein the first context corresponds to an Ethernet address.

4. The method of claim 1, wherein the first entry includes two MPLS labels.

5. An apparatus for storing MAC addresses and MPLS labels in a content addressable memory, the content addressable memory including an associative portion and a random access portion, the associative portion including one or more entries each including a key, the random access portion for storing information relevant to each key, the apparatus comprising:

means for determining if a key is present in a first entry in the associative portion for a first context, either as a source address or destination address or both;

means for locating a first key portion of the key to be associated with an MPLS label;

means for checking the first key portion for all other keys in the content addressable memory to see if the first key portion matches;

means for marking, if the first key portion does not match, the address in the associative portion of the first entry to indicate that the address is to be associated with a second context, the second context being an MPLS label; and means for adding information relevant to the second context and associated with the address to the random access portion including mapping the address to relevant information stored in the random access portion associated with the first context and the second context.

6. The apparatus of claim 5, further comprising:

means for locating, if the first key portion matches, a second key portion of the key to be associated with a second MPLS label;

means for checking the second key portion for all other keys in the content addressable memory to see if the second key portion matches;

means for marking, if the second key portion does not match, the address in the associative portion to indicate that the address is to be associated with a second context, the second context being an MPLS label; and means for adding information relevant to the second context and associated with the address to the random access portion including mapping the address to relevant information stored in the random access portion associated with the first context and the second context.

7. The apparatus of claim 5, wherein the first context corresponds to an Ethernet address.

8. The apparatus of claim 5, wherein the first entry includes two MPLS labels.

* * * * *

UNITED STATES PATENT AND TRADEMARK OFFICE
CERTIFICATE OF CORRECTION

PATENT NO. : 6,606,681 B1  Page 1 of 1
DATED : August 12, 2003
INVENTOR(S) : Necdet Uzun It is certified that error appears in the above-identified patent and that said Letters Patent is hereby corrected as shown below:

Column 13,
Line 23, replace "checking first" with -- checking the first --

Signed and Sealed this

Twenty-eighth Day of December, 2004

JON W. DUDAS
*Director of the United States Patent and Trademark Office*